No. 752,308. Patented February 16, 1904.

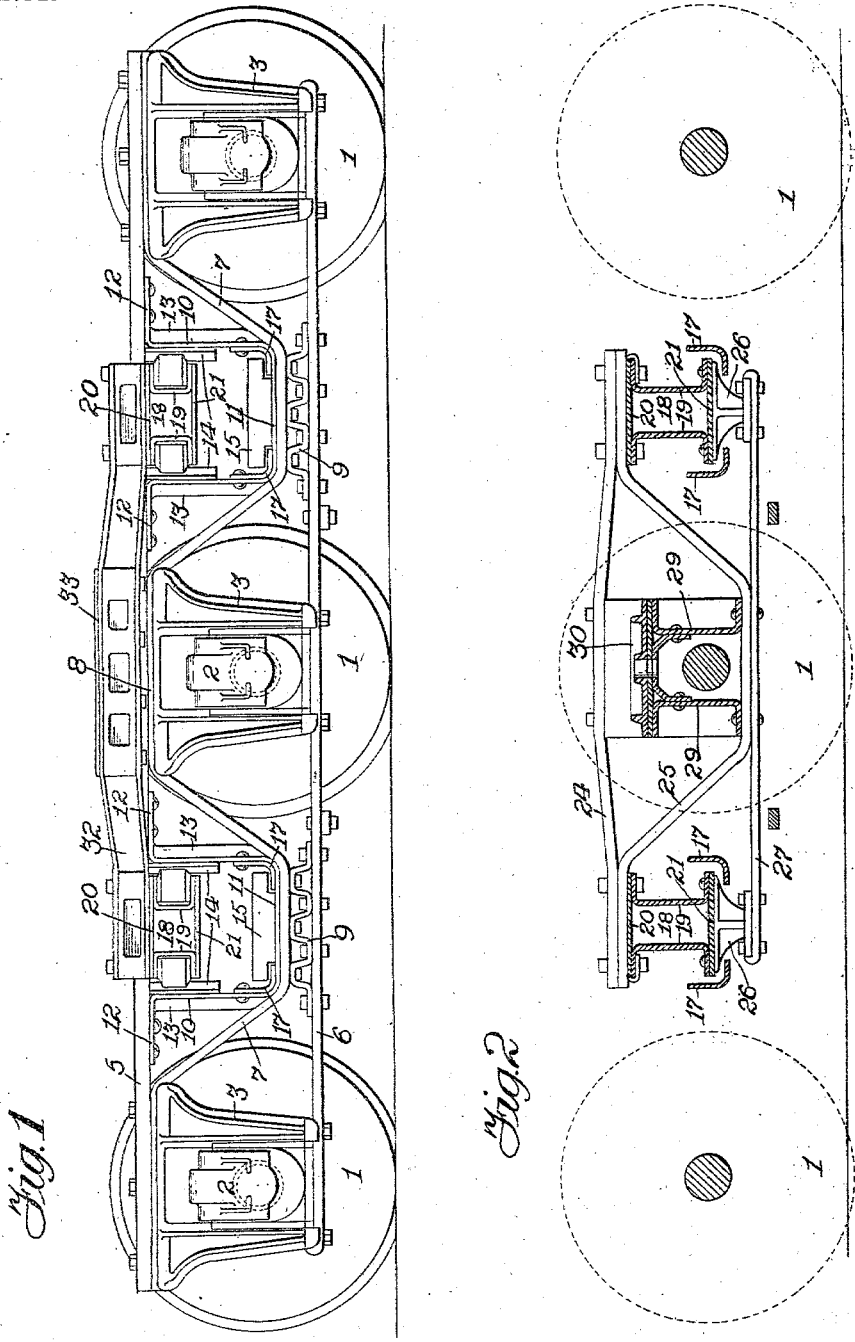

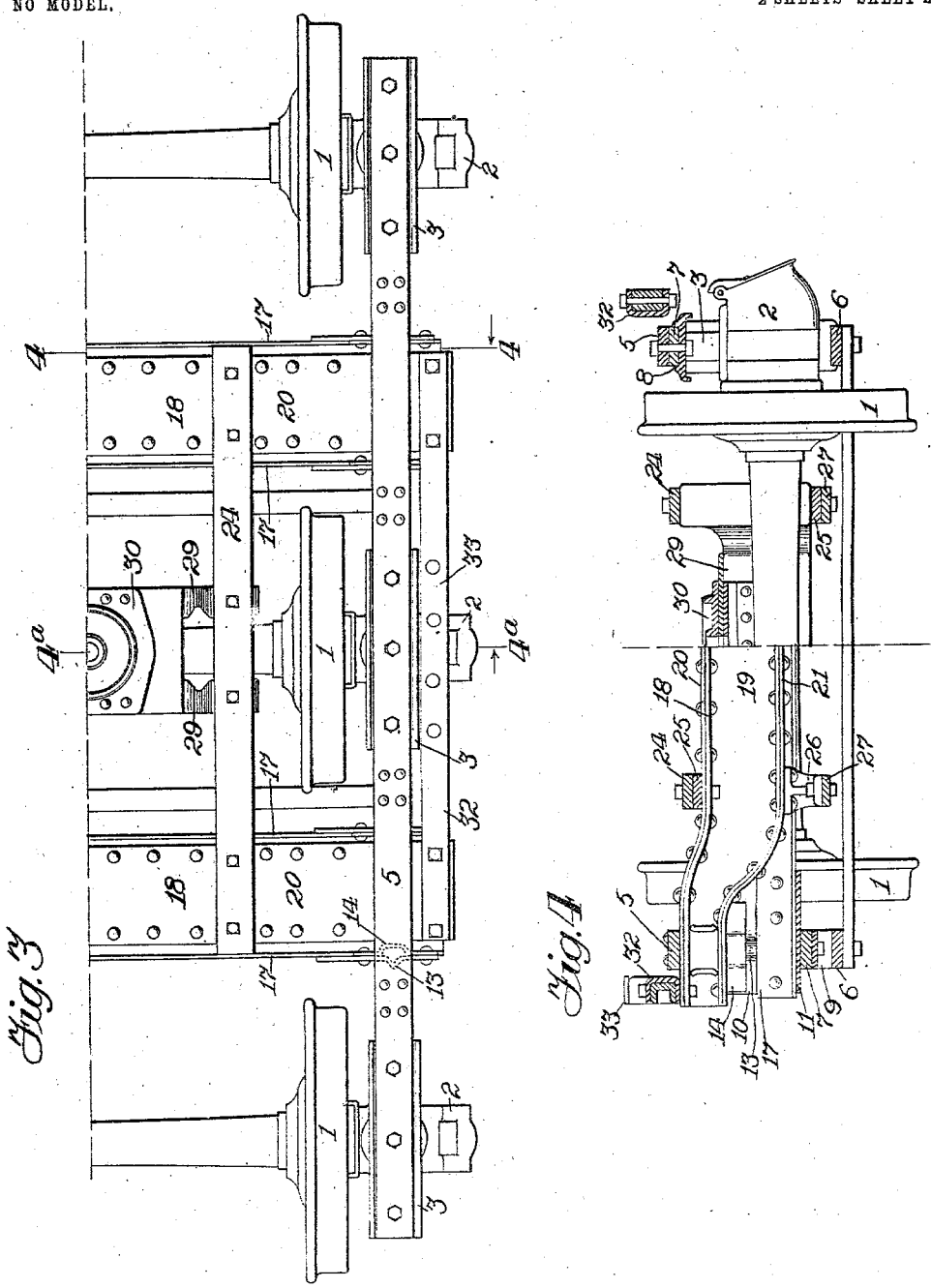

UNITED STATES PATENT OFFICE.

ARNOLD STUCKI, OF ALLEGHENY, PENNSYLVANIA, ASSIGNOR TO STANDARD STEEL CAR COMPANY, OF PITTSBURG, PENNSYLVANIA, A CORPORATION OF PENNSYLVANIA.

RAILWAY-TRUCK.

SPECIFICATION forming part of Letters Patent No. 752,308, dated February 16, 1904.

Application filed August 13, 1903. Serial No. 169,357. (No model.)

*To all whom it may concern:*

Be it known that I, ARNOLD STUCKI, a resident of Allegheny, in the county of Allegheny and State of Pennsylvania, have invented a new and useful Improvement in Railway-Trucks; and I do hereby declare the following to be a full, clear, and exact description thereof.

My invention relates to railway-trucks; and its object is to provide a truck for carrying very heavy loads, and especially for use with car-bodies which must be carried quite low.

The invention consists of a six-wheeled truck having trussed side frames, so as to decrease the height of the frame above the journal-boxes, and also consists in a trussed bridge connecting the two bolsters of the six-wheeled truck, so arranged as to prevent breakage at the neck of the bridge and also so that the center plate can be carried low down.

In the accompanying drawings, Figure 1 is a side view of my improved truck. Fig. 2 is a central longitudinal section through the same. Fig. 3 is a plan view, partly in section, of one-half thereof; and Fig. 4, on the left side, is a transverse section on the line 4 4, Fig. 3, and on the right side a similar section on the line 4ª 4ª, Fig. 3.

My truck is especially designed for cars having a high carrying capacity and wherein the floor must be kept reasonably low in order to facilitate the loading and unloading of heavy articles, such as castings, machines, and the like. For this purpose the truck must be made very compact in order to get it in the limited space available and must also have a very high carrying capacity. In order to keep the pressure of the wheels on the rails within a reasonable limit, the truck is of the six-wheeled type, as illustrated, although the invention is not entirely limited thereto, as it may be applied to a truck having eight, ten, or even more wheels.

All six-wheeled trucks heretofore constructed have had a bar or wheel-piece lying above the journal-boxes and connecting the several pedestals. This bar or wheel-piece heretofore has carried the load and distributed the same equally on all the journals, and therefore it had to be made very stiff, strong, and heavy. At the bottom of the journal-boxes pedestal tie-straps were used to keep the pedestals in place without, however, performing any other function. The wheel-pieces being so heavy necessarily projected a considerable distance above the tops of the journal-boxes. With cars having a low floor, such as my truck is designed for, there is no room for such large or deep wheel-pieces; but still it is absolutely necessary that the frame be practically rigid, else the center journal will carry more of the load than the two outside journals. In order to get the necessary stiffness in the side frames and without having an unnecessary quantity of metal or material above the journal-boxes, I form each side frame as a trussed girder having top, bottom, and diagonal members, the bottom member also acting as a pedestal tie-strap.

In the accompanying drawings the wheels are shown at 1, journal-boxes at 2, and the pedestals at 3. These may be of the usual or any preferred construction. The side frames are each composed of a top or compression member 5, a bottom or tension member 6, and the diagonal member 7. The latter is connected to the top member 5 at the ends and also at the middle portion 8. Intermediate its ends and middle portion the diagonal member 7 is bent downwardly, so as to separate it from the top member, and the depressed portions are secured to the tension member 6, either directly, but preferably by the interposition of the spacing-plates 9. Between the top member 5 and the depressed portions of the diagonal member 7 are placed the bolster guides or columns 10, which may be of the usual or any preferred construction, but which in the drawings are shown as plates bent into U shape, as shown, having the horizontal flat portion 11 resting on and secured to the diagonal member 7 and having its upper ends flanged outwardly, as at 12, for riveting to the top member. The vertical portions of these plates are stiffened up by being made of a U shape in cross-section, as shown at 13. To the vertical portions are riveted the bolster-guides 14, and over the horizontal portion is secured the spring-seat 15.

The side frame described is practically a rigid truss, the bar 5 being the top or compression member, while the bar 7 is the diagonal member and the bar 6 the bottom or tension member thereof, and the bolster guides or columns 10 form the strut of the truss. While in the drawings I have shown a single bar 7 for forming both depressed portions, it is obvious that two bars might be used for this purpose, the meeting or overlapping ends of said bars lying above the central pedestal 3. The pedestals are secured to the bars 5 and 7 in the usual or any preferred way, and the bottom member 6 may also be attached to the lower ends of the pedestal in the ordinary way.

The side frames of the truck may be connected by any suitable cross members. I have shown for this purpose angle-bars 17, riveted to the columns 10, and diagonal member 7. With this form of truck there necessarily are two bolsters or transoms, the drawings showing the bolsters 18, which may be of any preferred construction, but are shown as composed of two parallel channel members 19 and top and bottom cover-plates 20 and 21. These bolsters are depressed between their ends, as shown in Fig. 4, so as to carry the center plate-supporting truss as low as possible.

The center bearing-plate in a six-wheel truck is usually supported by a bridge connecting the two bolsters. Ordinarily only a top and diagonal bar are used for this purpose. This necessarily requires the use of very large bars in order to prevent bending where the bridge meets the bolster. In order to overcome this weakness, I form the bridge as a truss by connecting the bolsters by means of a bottom or tension bar secured to brackets fastened to the bottom of the bolster, thus preventing the bolsters from rocking.

The bridge shown in the drawings consists of a pair of trusses each having a top or compression bar 26 and a diagonal bar 25, both of said bars having their ends secured to the top of the bolsters and the top bar preferably being bent slightly upwardly, while the bottom bar is depressed downwardly, as shown in Fig. 1. Secured to the bottom cover-plate of the bolsters are brackets 26, which may be of any suitable shape or material. These brackets on the two bolsters are connected by the bottom bar or tension member 27, which is secured at its middle to the depressed portion of the diagonal bar 25. Instead of using the brackets 26 the bolster itself might be made very narrow and deep to take the place of such brackets.

Between the top and diagonal bars 24 and 25 is placed a cross-bridge, consisting of two spacers 29, preferably formed of pressed plate, as shown, and serving to carry the center bearing-plate 30. These spacing-pieces form the strut between the top, diagonal, and bottom bars of the bridge, and in order that the center plate may be carried very low said spacing-pieces are depressed between their ends, as clearly shown in Fig. 4, thus bringing the top surface thereof considerably below the end portions.

The bridge described is a truss, and therefore the bending moment heretofore exerted at the neck of the bridge—that is, the point where the same meets the bolsters—is overcome, thereby overcoming the principal source of weakness in prior trucks of this kind.

Secured to the ends of the bolsters 18 is a bridge-bar 32, shown as a pressed channel-bar bowed upwardly and having a wear-plate 33 secured to its central portion, which acts as the truck side bearing.

It will be observed that the truck-frame described is very strong and rigid and also reasonably low, thus permitting the floor of the car carried thereby to be placed very low. Both the side frames and the bridge are trusses, which combine a maximum amount of strength with a minimum amount of metal.

What I claim as my invention, and desire to secure by Letters Patent, is—

1. In a car-truck, the combination with the side frames, of two bolsters or transoms supported by said side frames and being depressed between their ends, a bridge connecting the depressed portions of said bolsters, and a center bearing-plate carried by said bridge.

2. In a car-truck, the combination with the side frames, of two bolsters or transoms supported by said side frame and being depressed between their ends, a bridge connecting the depressed portions of said bolsters and comprising a truss having its top chord substantially straight, and a center bearing-plate carried by said bridge.

3. In a car-truck, the combination with side frames, of two bolsters or transoms supported by said side frames, a bridge connecting said bolsters and comprising a pair of longitudinal members supported on said bolsters, and a transverse member connecting said longitudinal members and having its upper surface depressed between its ends, and a center bearing-plate supported by said depressed portion.

4. In a car-truck, the combination with the side frames, of two bolsters or transoms supported by said side frames, a bridge connecting said bolsters and comprising two trusses supported on said bolsters, transverse members connecting said trusses and having their upper surfaces depressed between their ends, and a center bearing-plate supported by said depressed portions.

5. In a car-truck, the combination with side frames, of two bolsters or transoms supported by said side frames and being depressed between their ends, a bridge connecting the depressed portions of said bolsters and comprising two longitudinal members supported on said bolsters, and a transverse member connected to said longitudinal members and, being depressed between its ends, and a center bearing-plate supported by said depressed portion.

6. In a car-truck, the combination with side frames, of two bolsters or transoms supported by said side frames and being depressed between their ends, a bridge connecting the depressed portions of said bolsters and comprising a pair of trusses supported on said bolsters, said trusses comprising tension, diagonal and compression members, struts for said trusses comprising a pair of spacing-pieces having their ends interposed between the tension and compression members, said spacing-pieces connecting the two trusses and having their upper surfaces depressed between their ends, and a center bearing-plate supported by said depressed portions.

7. In a car-truck, the combination with the side frames, of two bolsters or transoms supported by said side frames, a bridge connecting said bolsters consisting of a top member, a bottom member, and diagonal members connecting said top and bottom members.

8. In a car-truck, the combination with the side frames, of two bolsters or transoms supported by said side frames, a bridge connecting said bolsters and comprising a top or compression member, a bottom or tension member, a diagonal member having its ends secured to the top member and being then bent downwardly therefrom, struts interposed between said top and diagonal members, and a center bearing-plate carried by said bridge.

9. In a car-truck, the combination with the side frames, of two bolsters or transoms supported by said side frames, and a bridge connecting said bolsters, said bridge comprising a top or compression member, a bottom or tension member and a diagonal member having its ends secured to the top bar, and having its middle portions separated therefrom, cross pieces or bars interposed between said top and diagonal members and forming struts therefor, and a center bearing-plate supported on said cross-pieces.

10. In a car-truck, the combination with the side frames, of two bolsters or transoms supported by said side frames, a bridge connecting said bolsters consisting of a pair of top or compression members, a pair of bottom bars or tension members, and a pair of diagonal members having their ends secured to the top members and their middle portions separated therefrom, a pair of cross pieces or bars interposed between said compression, diagonal and tension members and forming struts therefor, and a center bearing-plate supported on said cross-bars.

11. In a car-truck, the combination with side frames, of two bolsters or transoms supported by said side frames, a bridge connecting said bolsters comprising a pair of trusses supported on said bolsters, said trusses comprising tension diagonal and compression members, struts for said trusses comprising a pair of spacing-pieces having their ends interposed between the tension and compression members, and having their upper surfaces depressed between the ends, and a center bearing-plate supported by said depressed portions.

12. In a car-truck, the combination with side frames, of two bolsters or transoms supported by said side frames, a trussed bridge connecting said bolsters, said bridge comprising a top or compression member, a diagonal member, said members having their ends secured to the top of the bolster and being separated between their ends, and a bottom member connected to the bottom of the bolster and to the depressed portion of the tension member, and a center plate carried by said bridge.

13. In a car-truck, the combination with the side frames, of two bolsters or transoms supported by said side frames, a trussed bridge connecting said bolsters and comprising a top or compression member, a diagonal member, said members having their ends secured to the top of the bolster and being separated between their ends, brackets secured to the lower side of the bolsters, and a tension member secured to said brackets and the depressed portion of the diagonal member.

14. In a car-truck, the combination with the side frames, of two bolsters or transoms supported by said side frames, a trussed bridge connecting said bolsters, said bridge comprising a top or compression member, a diagonal member, said members having their ends secured to the top of the bolsters and separated between their ends, spacing-pieces interposed between said members and forming struts therefor, a center bearing-plate supported by said spacing-pieces, and a tension member secured to the lower sides of the bolster and the depressed portion of the diagonal member.

In testimony whereof I, the said ARNOLD STUCKI, have hereunto set my hand.

ARNOLD STUCKI.

Witnesses:
G. C. RAYMOND,
ROBERT C. TOTTEN.